United States Patent [19]

Carboni

[11] Patent Number: 5,062,263

[45] Date of Patent: Nov. 5, 1991

[54] EXHAUST GAS DEPURATOR HAVING A CATALYTIC ACTIVITY, AND SILENCER, FOR INTERNAL COMBUSTION ENGINES

[75] Inventor: Luigi Carboni, Turin, Italy

[73] Assignees: Luciano Bonansea, Turin, Italy; I.R.T.I. Istituto Di Ricera E Trasferimenti Tecnologic Alle Imprese srl, Rome, both of Italy; a part interest to each

[21] Appl. No.: 493,314

[22] Filed: Mar. 14, 1990

[30] Foreign Application Priority Data

Apr. 12, 1989 [IT] Italy .................. 67264 A/89

[51] Int. Cl.$^5$ .................................. F01N 3/28
[52] U.S. Cl. ........................... 60/299; 422/176; 422/177; 422/180
[58] Field of Search .............. 60/299; 422/176, 177, 422/180

[56] References Cited

U.S. PATENT DOCUMENTS

| 3,180,712 | 4/1965 | Hamblin | 422/171 |
| 3,755,204 | 8/1973 | Sergeys | 422/180 |
| 4,382,323 | 5/1983 | Chapman | 422/180 |
| 4,576,800 | 3/1986 | Retallick | 422/180 |
| 4,597,262 | 7/1986 | Retallick | 422/180 |
| 4,616,732 | 10/1986 | Carboni . | |

FOREIGN PATENT DOCUMENTS 0166480 1/1989 European Pat. Off. .

Primary Examiner—Douglas Hart
Attorney, Agent, or Firm—Young & Thompson

[57] ABSTRACT

An exhaust gas depurator having a catalytic activity, for internal combustion engines, further acting as discharge silencer, which comprises in combination two elements having a catalytic activity, and a substantially non-dissipative noise silencer interposed between the two catalytic elements. Each element having a catalytic activity is formed by a strip of metal sheet covered by a catalytically active material and wound to a spiral, and each strip has a number of drawn projections, inclined with respect to the longitudinal and the transverse directions of the strip, which act as spacers among the winding coils of the strip and act as baffles for the exhaust gas flow. Some openings are provided for in the strips. The non-dissipative silencer element is formed by a number of annular disks wherein tapered chambers are drawn, and the disks are coupled two by two and then the couples of disks are superimposed.

11 Claims, 3 Drawing Sheets

EXHAUST GAS DEPURATOR HAVING A CATALYTIC ACTIVITY, AND SILENCER, FOR INTERNAL COMBUSTION ENGINES

BACKGROUND OF THE INVENTION

This invention refers to an exhaust gas depurator having a catalytic activity, for internal combustion engines, further acting as discharge silencer.

Exhaust gas depurators having a catalytic activity, for internal combustion engines, are well known In the more customary embodiments, such depurators include a ceramic body traversed in the longitudinal direction by a lot of small rectilinear channels, whose cross section is usually square and amounts to about 1 square millimeter. These channels are separated from each other by walls whose thickness is of about 0.2 millimeter and the surfaces of which are lined by a deposit of platinum. The very high manufacturing cost of such a construction is obvious. The exhaust gases are compelled to pass along said channels having a little cross section, and during this travel they lap on the platinum lining. The platinum exerts on the exhaust gases a catalytic action which aims to oxidize the carbon monoxide and the unburnt hydrocarbons and to decompose the nitrogen oxides As long as the catalyst is in good conditions, the depuration of the exhaust gases may attain the removal of 80% to 90% of the harmful impurities. This effective condition of the catalyst, however, has a relatively short duration, even in the case of carburation engines supplied by gasoline. For such engines a limit run of about 5000 kilometers is generally prescribed, after which the exhaust gas depurator is to be replaced. This is due to the poisoning of the catalyst and, above all, to a clogging of the little channels of the depurator body. Such depurators, on the other hand, are not even mounted on diesel cycle engines, because the sulphur compounds contained in their exhaust gases could put the depurator out of use after some hours.

Very serious disadvantages of said depurators reside, therefore, in the reduced duration thereof with respect to their cost, as well as in their inadequacy for being used with diesel cycle engines. But another serious disadvantage of these depurators resides in the great resistance opposed by the little channels of the ceramic body of the depurator to the passage of the exhaust gases. Such great resistance gives rise to a noticeable counterpressure at the discharge of the engine, and therefore to a serious reduction of its efficiency.

Some improvement has been obtained in these depurators having a catalytic activity by replacing the bored ceramic body by a pleated metal sheet, covered by a catalytic material and adequately folded in order to determine a great number of rectilinear channels of a little cross section. This allows a more economical manufacture, however the disadvantages of an insufficient duration and a high resistance opposed to the flux of gases are not reduced.

The above cited exhaust gas depurators do not provide a specific silencing action, although in practice they somewhat attenuate the noise, only as a consequence of the high resistance opposed to the passage of the exhaust gases.

SUMMARY OF THE INVENTION

The first object of this invention is to realize an exhaust gas depurator for internal combustion engines, which should be of relatively economical manufacture, have a high efficiency in depuration although not opposing a high resistance to the passage of the exhaust gases, and at the same time perform an effective action in silencing the exhaust gases, not accompanied by any high resistance opposed to the gas flux.

This object is attained, according to the invention, by a depurator characterized in comprising the combination of: - at least one element having a catalytic activity, formed by a strip of metal sheet covered by a catalytically active material and wound to a spiral, said strip having a number of drawn projections, inclined with respect to the longitudinal and transverse directions of the strip, acting as spacers among the winding coils of the strip and acting as baffles for the exhaust gas flow; and - at least one substantially non-dissipative noise silencer.

Thanks to these characteristics, the element having a catalytic activity may be manufactured in a relatively non-expensive way, and the passages formed therein for the flow of exhaust gases, being limited by the inclined projections and therefore extending helicoidally, cause the exhaust gases to effectively lap the catalytic surfaces, even without any need for said passages to be very little. As a result, on one hand the depurator does not oppose any great resistance to the exhaust gas flow, and it does not noticeably trouble the engine efficiency, and on the other hand the passages therein are not quickly clogged by solid deposits, and therefore the element has a duration well longer than usual. Of course, due to the absence of a noticeable resistance opposed to the flow, the element having a catalytic activity gives a very poor contribution to silencing the exhaust noise, but this task is entrusted to the combined noise silencer. This latter, being of a substantially non-dissipative kind, does not oppose any further noticeable resistance to the flow of exhaust gases. As a result, the exhaust gases may be effectively depurated and silenced, without noticeable reduction of the engine efficiency and ensuring to the depurator-silencer a long duration. A consequence of these characteristics is that the depurator-silencer according to the invention may be conveniently applied even to the discharge of diesel cycle engines.

Preferably, said inclined projections drawn from the strip of metal sheet intended to form the element having catalytic activity have a sinuous shape, and each projection shows on a half thereof a curvature directed towards one side, and on the other half thereof a curvature directed towards the opposite side. Such a shape attains a high efficiency in causing the gases to lap the catalytic surfaces, and at the same time the thus shaped projections are particularly effective in spacing the coils of the strip wound to a spiral.

Preferably, moreover, the strip has through openings located along a central region, among said projections. Such openings are of use in the manufacture of the strip, and operatively they open some communications among the different gas passages defined by the strip. Due to these communications some turbulence takes place and improves the effective lap of the catalytic surfaces by the gases. Moreover these communications realize some anastomoses among the different gas passages, which allow correct operation of the depurator even when some passages become clogged. This also contributes to improve the duration of the device.

Preferably the non-dissipative silencer element comprises a number of tapered chambers, oriented from a substantially free central passage towards the periphery of the device. Such a structure ensures an effective reduction of all frequency components of the noise, without involving any noticeable energy dissipation. The structure of this silencer element may be economically realized by means of a number of annular disks of drawn metal sheet, coupled two by two and superimposed. Preferably said disks are perforated in their regions intermediate the tapered chambers. This allows communication among the spaces intermediate the superimposed disk couples, whereby in these spaces occurs a reduction of the background noise carried by that portion of the gases which does not act on the tapered chambers but on the spaces intermediate the chambers.

Preferably, two successive elements having catalytic activity are provided for, and the silencer element is interposed between said two catalytic elements.

Preferably, at the outlet of the depurator there is a chamber for collection of the solid waste, which chamber communicates through openings with the passage for the exhaust gases. The solid waste of the chemical reactions operated by the catalysts may thus be collected, by avoiding discharging them in the ambient. The solid waste may then be discharged from time to time from the collection chamber wherein they have accumulated.

BRIEF DESCRIPTION OF THE DRAWINGS

These and other characteristics and the advantages of the subject of the invention will appear more clearly from the following description of a preferred embodiment, having the character of a non limiting example, which is diagrammatically shown in the appended drawings, wherein.

DETAILED DESCRIPTION OF A PREFERRED EMBODIMENT

Figure 1:
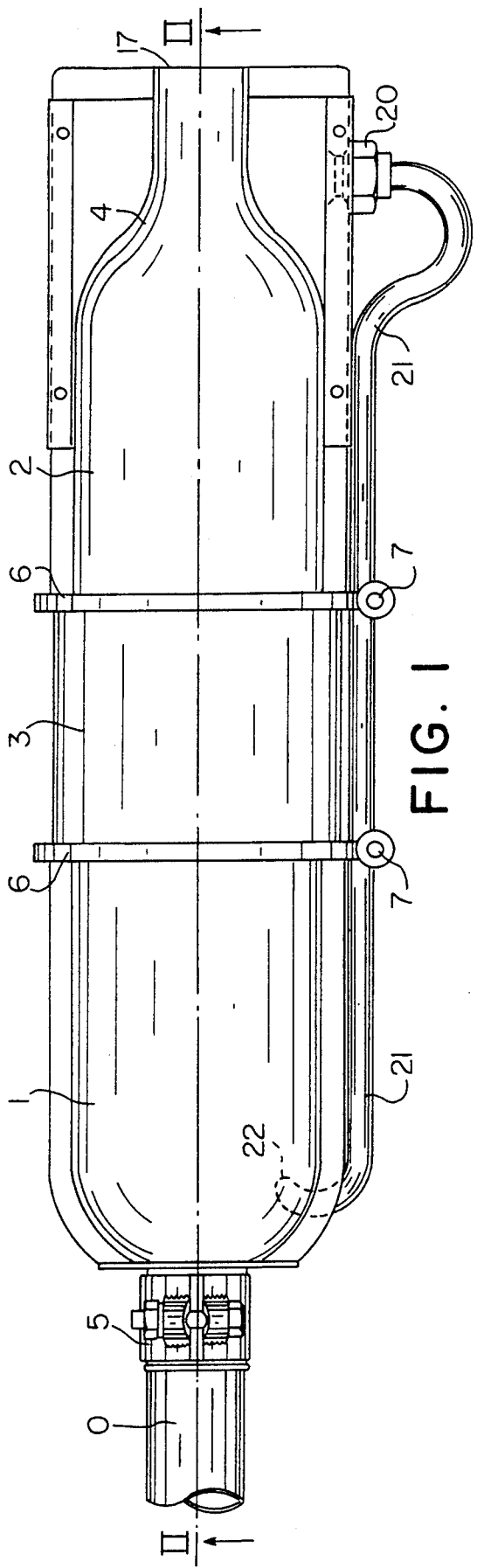
FIG. 1 is an external plan view, on a reduced scale, of the depurator and silencer according to the invention.
Figure 2:
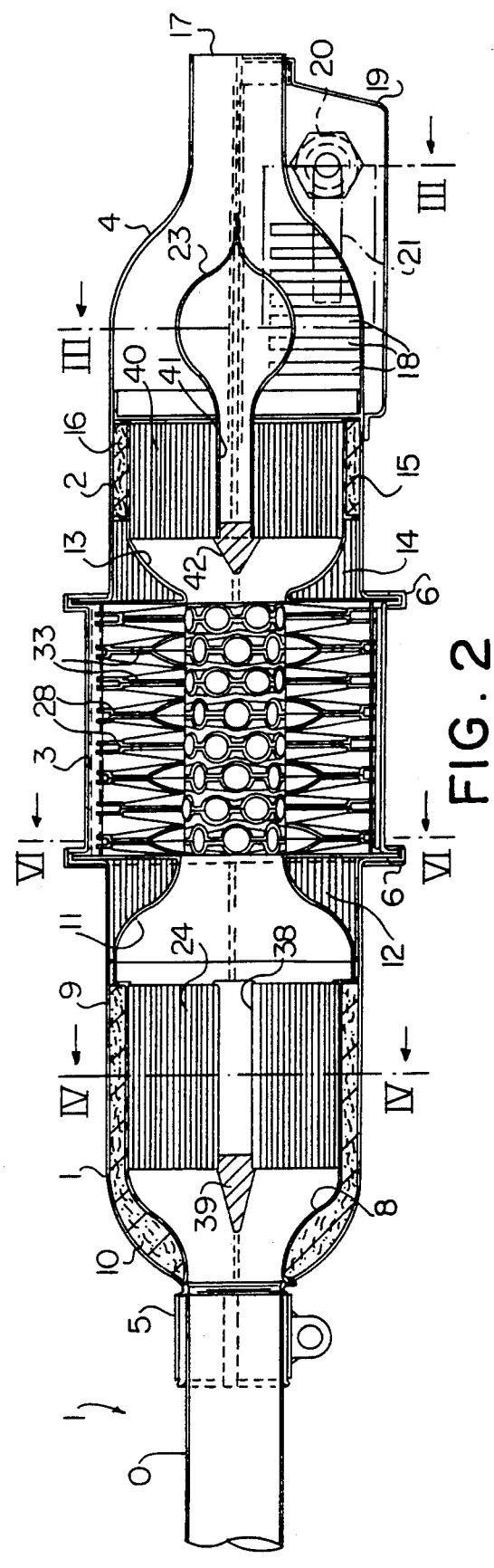
FIG. 2 shows a vertical section thereof, taken along line II—II of FIG. 1.

With reference at first to FIGS. 1 and 2, which show the whole of a depurator-silencer device according to the invention, number 0 indicates an end portion of the exhaust tube of an internal combustion engine (not shown), to which the depurator is connected by means of a clamp 5. The device is delimited by a first casing portion 1, housing a first element having a catalytic activity, a second casing portion 2, housing a second element having a catalytic activity, a third casing portion 3, arranged between the first portion 1 and the second portion 2 and housing a silencer element, and a fourth casing portion 4, intended to collect the solid waste and to discharge into the ambient the depurated gases. The casing portions 2 and 4 may advantageously be formed by a single constructional element. The casing portions 1, 2 and 4 are preferably formed each by a pair of drawn shells of stainless steel sheet, mutually connected by flanges along the horizontal diameter. The casing portion 3 is preferably formed by a length of stainless steel tube provided with flanges, and it is connected to the casing portions 1 and 2 by means of clamps 6 having tightening means 7.

From the inlet of the device, at clamp 5, departs a divergent duct 8 which is extended by a cylindrical duct 9. These parts are preferably made of stainless steel sheet, and they are traversed by holes. The space between said parts 8, 9 and the casing portion 1 is filled with a material such as copper wool 10. Within the cylindrical duct 9 is arranged a first element 24 having a catalytic activity, to be described in detail later on. The cylindrical duct 9 is extended by a convergent duct 11 which opens in the center of a silencer element 28–33. This latter is arranged within the casing portion 3 and will be described in detail later on. A thermoacoustic insulating material 12 is preferably inserted between the convergent duct 11 and the outer casing portion 1.

At the outlet of the silencer element 28–33 mounted within the casing portion 3 there is a divergent duct 13 which is extended by a perforated cylindrical duct 15. The space between the divergent duct 13 and the outer casing portion 2 is preferably filled with a thermoacoustic insulating material 14, whereas the space between the perforated cylindrical duct 15 and the outer casing portion 2 is preferably filled with copper wool 16. Within the cylindrical duct 15 is arranged a second element 40 having catalytic activity to be described in detail later on. The fourth casing portion 4 is tapered towards a discharge opening 17 which opens in the ambient. The bottom portion of this casing section is traversed by openings 18 which communicate with a collection box 19. A tube 21 is connected at 20 to box 19, and it extends towards the forward end of the device, wherein it opens with a mouth 22 oriented in the direction of the flux of entering gases. Said mouth 22 receives therefore a slight aerodynamic action of suction. Within the fourth portion 4 of the device casing there is housed a central spindle-shaped body 23, whose shape is such as to accompany the gas flow, and which may be made of stainless steel sheet.

Figure 4:
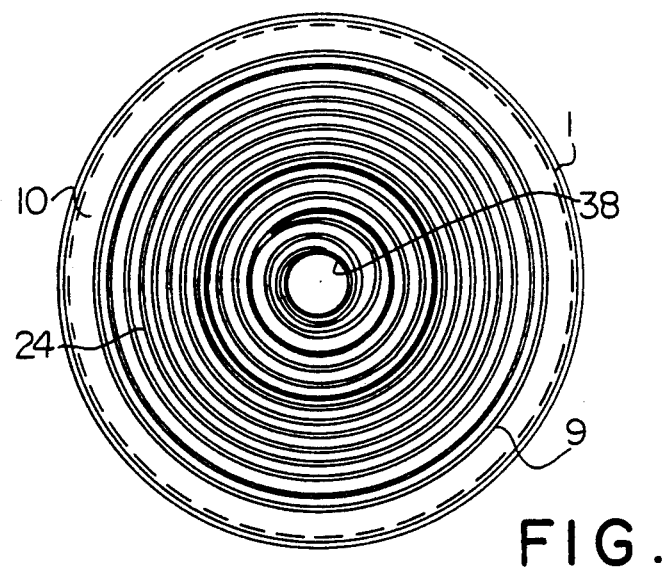
FIG. 4 shows on an enlarged scale a cross section of an element having a catalytic activity, taken along line IV—IV of FIG. 2.
Figure 5:
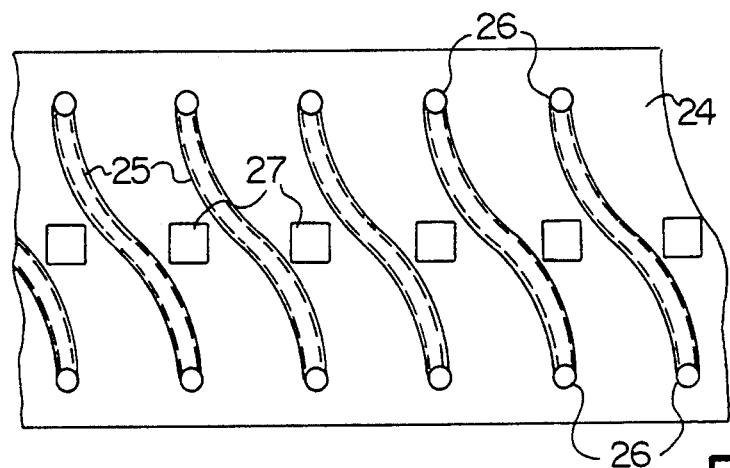
FIG. 5 is a plan view of a portion of a blank for the metal strip intended to form the element having a catalytic activity.
Figure 3:
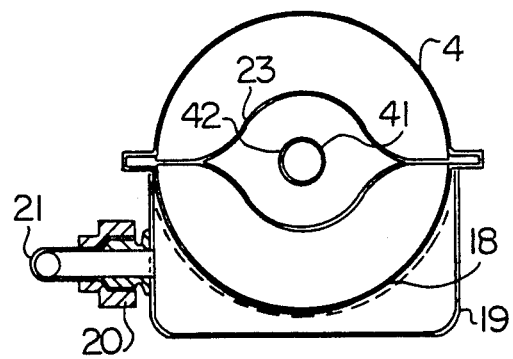
FIG. 3 shows a cross section thereof, taken along the broken line III—III of FIG. 2.

The first element 24 having a catalytic action, housed within the cylindrical duct 9, is formed (see FIG. 4) by a metal sheet strip 24 wound to a spiral. The shape of the strip 24 appears in detail from FIG. 5. From the strip 24 there are drawn, at uniform distances and along an inclined direction, a number of projections 25. Preferably, as shown, each projection 25 has two successive portions having opposite curvatures, whereby each projection has in plan view a general sinuous shape, like an extended "S". The strip 24 may be shorn from a stainless steel sheet having a thickness of about 5/10 millimeter, and the height of the projections 25 above the plane of the strip may be of about 2 millimeters. The distance between adjacent projections, measured along the longitudinal direction of the strip, may be of about 26 millimeter. Preferably the projections 25 extend between end holes 26 in order to facilitate the drawing operation. Moreover it is of advantage that openings 27 are provided for along the central line of the strip 24, each one between two drawn projections 25. The openings 27 are bored before drawing the projections 25, and thanks to the presence thereof the metal sheet strip 24 may be machined step by step in a very economical and accurate way. The thus shaped strip 24 is wound to a spiral around a core formed by a length of tube 38 closed at one end by a plug 39. Of course, during the winding of strip 24 the projections 25 affect an exact spacing of the coils, and then said projections define between the adjacent coils a number of passages of relatively great section, having a sinuous shape. On the other hand, the bores 26 and openings 27 allow limited communications among the passages separating the different coils of the wound strip 24.

The second element 40 having a catalytic activity, arranged within the cylindrical duct 15, is also formed by a strip of metal sheet 40 wound to a spiral on a central core 41 closed by a plug 42. The structure of the metal sheet strip 40-may be completely similar to the structure of the already described metal sheet strip 24, except that its size may generally be somewhat reduced. For this reason the strip 40 will not be further described in detail. The central core 41 of the second element 40 having a catalytic activity may advantageously be formed by an extension of the above described spindle-shaped body 23.

The strips 24 and 40 forming the elements having a catalytic activity are made of a metal sheet covered by a deposit of a suitable matter having a useful catalytic activity onto the exhaust gases, either in oxidizing the carbon monoxide and the unburnt hydrocarbons, or in reducing the nitrogen oxides, or even in decomposing or modifying other compounds, such as the sulphur compounds which are present particularly in the exhaust gases of diesel cycle engines. The catalytically active substances applied onto the metal sheets 24 and 40 may be identical or different from each other, and they may differ according to the specific application foreseen for the depurator. As a preferred example, the metal sheet 24 forming the first element having a catalytic activity may advantageously be covered by palladium, in order to be particularly active onto the carbon monoxide, the unburnt substances and the nitrogen oxides, whereas the metal sheet 40 forming the second, element having a catalytic activity may advantageously be covered by tantalum, in order to be particularly active onto the sulphur compounds.

Figure 6:
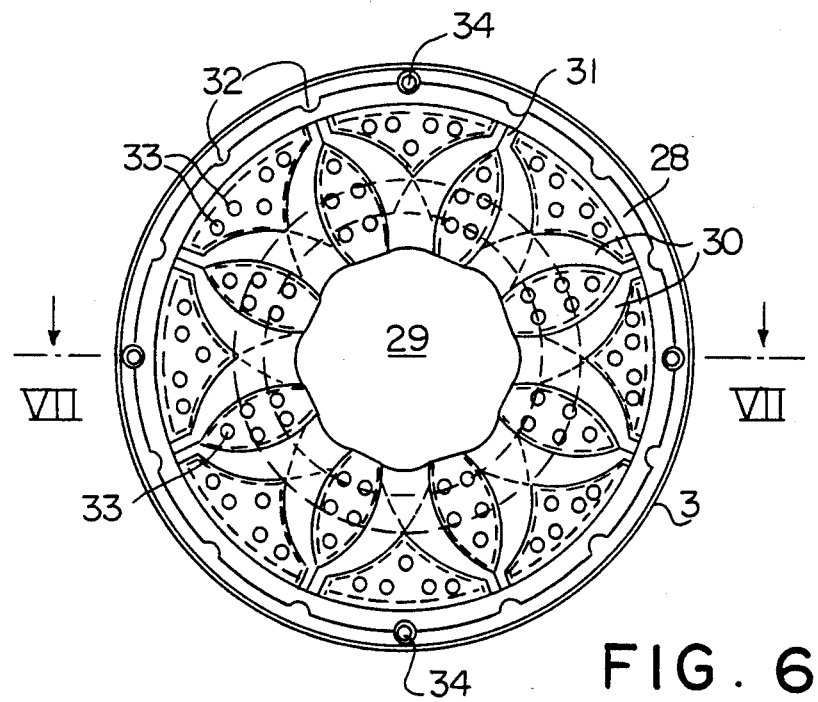
FIG. 6 shows on an enlarged scale a cross section of the silencer element, taken along line VI—VI of FIG. 2.
Figure 7:
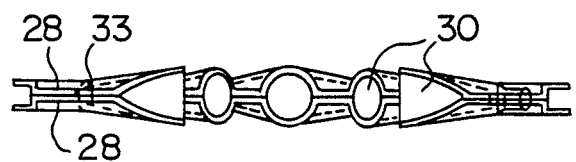
FIG. 7 shows a diametrical section of a couple of disks forming the silencer element, taken along line VII—VII of FIG. 6.

The silencer element 28-33 housed within the third portion 3 of the casing is realized by means of annular disks of drawn metal sheet, for example of stainless steel, shaped as shown by FIG. 6. Each disk 28 has a free central opening 29, from which depart some drawn cavities 30 which are tapered towards the periphery and terminate at openings 31. The peripheral openings 31 are much smaller than the central openings of the cavities, for example the peripheral openings may have a diameter of ¼ the diameter of the central openings. The thus drawn disks 28 are coupled two by two in symmetrical positions, as shown by FIG. 7, and they are connected by means of some welding points. In this manner the registering cavities of both disks delimit chambers 30 which extend, from the central free passage 29, by tapering towards the periphery, where they show the small openings 31. Such chambers 30 are therefore shaped like inverted trumpets. In the shown embodiment the disks 28 have an octagonal symmetry, and therefore the couples of disks may be superimposed by displacing them angularly by 22° 30′ from one another, thus attaining the disposition shown by FIG. 2. In order to render easy the correct superimposition of the couples of disks, each disk 28 has along its periphery sixteen uniformly spaced notches 32, which are to be put in register with some guide shafts 34 on the casing portion 3. Moreover, the disks 28 have a number of bores 33 (eighty bores according to the embodiment shown) which traverse the disks in their regions intermediate the tapered cavities 30.

The operation of the described depurator-silencer device is as follows. The exhaust gases from the exhaust tube 0 enter the divergent duct 8 which leads them to the first element 24 having a catalytic activity. A part of those gases traverses the bores of ducts 8 and 9 and enters the filling 10 of copper wool, where it undergoes a chemical action aiming to neutralize a part of the nitrogen oxides. Then the gases pass along the passages defined by the sinuous projections 25 between adjacent coils of the metal sheet strip 24 wound to spiral, which forms the first element having a catalytic activity. These passages are relatively large (with the stated dimensions they have a cross section amounting to about 50 square millimeters) and therefore no noticeable loss of charge is encountered. However the inclined position and the sinuous shape of the passages defined by the projections 25 cause the gases to effectively lap the catalytic surface deposited onto the metal sheet 24, whereby the gases are effectively treated by the catalytically active substance present and depurated.

The convergent duct 11 leads the thus depurated gases to the inner passage 29 of the silencer element 28-33 formed by the superimposed disks 28. Although passing through this element without incurring any loss of charge, due to the central passage 29 being free, the gases which carry the sound waves of the noise produced by the engine transmit their pressure variations to the chambers 30. These chambers, due to their tapered shape like inverted trumpets, effectively attenuate the noise carried by the gases, but in a non-dissipative way. Thanks to the tapered shape of the chambers, no proper resonance takes place, whereby the attenuation involves substantially the whole field of frequencies of the noise.

The central openings of the chambers 30 corresponding to the central passage 29 occupy most of the peripheral surface of the passage 29, but of course they cannot involve the whole peripheral surface of the central passage. Therefore, a part of the pressure variations carried by the gases penetrates the spaces intermediate the disks 28. On these pressure variations operate the bores 33 of disks 28, by allowing a transmission of the pressure variations in the longitudinal direction of the silencer element, and therefore a compensation of these pressures among the different spaces and finally a neutralization of the back-among ground noise carried by the gases.

Downstream the silencer element 28, the divergent duct 13 distributes the exhaust gas flow to the second element 40 having a catalytic activity, and this element repeats the action already affected by the first element 24 having a catalytic activity. From the physical point of view, this action is substantially identical to the former one, but the characteristics of the chemical intervention are different when, as it is preferred, the catalytically active substances deposited onto the two elements are different from one another. By using catalytic substances suitable for affecting mutual complementary actions, as in the preferred case of using palladium and tantalum, an extremely deep depuration of the exhaust gases may be obtained, with respect to all different kinds of polluting substances contained therein.

Some waste substances formed by the chemical reactions brought into action by the catalysts are solid. At the outlet of the second element 40 having a catalytic activity the gases have a rotational movement, due to the inclined position of the projections drawn from the metal sheet strip forming the element having a catalytical activity. Therefore the gases aim to accumulate the heavy solid waste particles against the inner surface of the convergent duct defined by the fourth casing portion 4. The presence of the spindle-shaped body 23 favorises this phenomenon. Therefore the solid waste particles encounter the openings 18, pass through the same and enter the box 19, where they deposit. Thus the solid waste is not discharged into the ambient through the outlet 17 with the depurated exhaust gases. The tube 21 which, through its mouth 22, undergoes a slight aerodynamic suction from the exhaust gases entering the depurator-silencer device, keeps within the box 19 a slight underpressure, which aids in entering and keeping collected said solid waste. These latter may then be discharged from time to time by only dismounting the box 19, whereas there is no need for dismounting the whole depurator device from the vehicle on which it is mounted.

Figure 8:
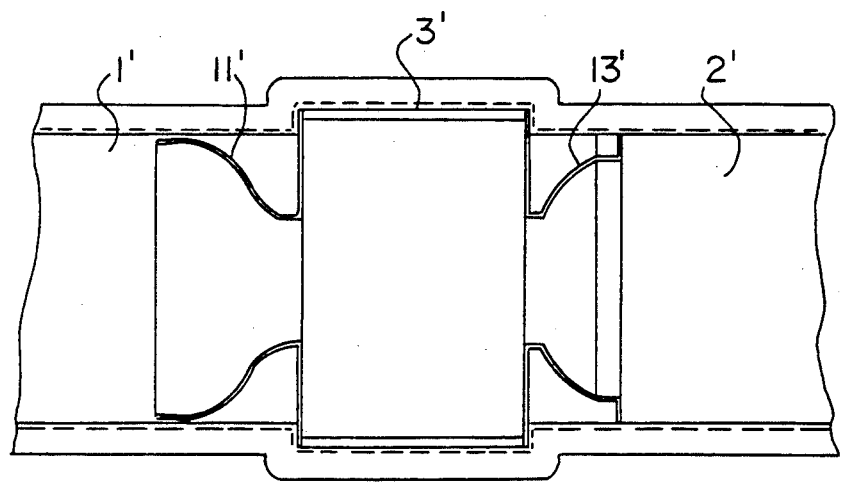
FIG. 8 shows a possible modification to the casing of the silencer element.

Of course, various modifications may be made to the exemplary embodiment described and shown. For example, as shown by FIG. 8, the different casing portions, 1' of the first catalytic element, 2' of the second catalytic element, and also 3' of the silencer element, may be formed by two coupled half shells, which may also form the convergent duct 11' and the divergent duct 13' and/or other casing portions. The choice among the different methods of manufacture may be done by the designer by keeping in mind different evaluations, including those of the available production means. The inclined disposition and also the sinuous shape of the projections 25 may be modified in various manners, and they may be chosen different for the two elements having a catalytic activity. In certain cases a single element having a catalytic activity may be sufficient, and then it may be arranged upstream or downstream the silencer element. This latter may have a structure different from the described one, provided that it is substantially non-dissipative or, at least, not much dissipative. Finally, the selection of the catalytically active substances deposited onto the strips forming the elements having a catalytic activity may be variously directed, in addition to the stated substances. For example one may consider the use of platinum, the so-called platinum black, palladium-coal or other catalysts, known or particularly developed for this specific purpose. Moreover, all particulars maybe replaced by technically equivalent means.

What is claimed is:

1. An exhaust gas depurator having a catalytic activity, for internal combustion engines, further acting as discharge silencer, comprising the combination of: at least one element having a catalytic activity, said element having a catalytic activity including a strip of metal sheet covered by a catalytically active material and wound to a spiral of several coils, said strip having a number of drawn projections, inclined with respect to the longitudinal and transverse directions of the strip, acting as spacers among the winding coils of the strip and acting as baffles for the exhaust gas flow, said inclined projections having a sinuous shape, each said projection showing on a half thereof a curvature directed towards one side, and on the other half thereof a curvature directed towards the opposite side; and at least one substantially non-dissipative noise silencer.

2. A depurator-silencer for exhaust gas as set forth in claim 1, wherein said strip forming the element having a catalytic activity has some through openings.

3. A depurator-silencer for exhaust gas as set forth in claim 2, wherein at least some of said through openings of the strip are located along a central region of the strip, one of them between each two adjacent projections.

4. A depurator-silencer for exhaust gas as set forth in claim 1, wherein said non-dissipative silencer element comprises a substantially free central passage and a number of tapered chambers, directed from said central passage towards the periphery of the device.

5. A depurator-silencer for exhaust gas as set forth in claim 4, wherein said silencer element comprises a number of annular disks of drawn metal sheet, wherein halves of said tapered chambers are drawn, said disks being coupled two by two and superimposed.

6. A depurator-silencer for exhaust gas as set forth in claim 5, wherein said disks have some regions intermediate said tapered chambers and are perforated in said intermediate regions.

7. A depurator-silencer for exhaust gas as set forth in claim 1, comprising a second element having catalytic activity, and said silencer element is interposed between said two catalytic elements.

8. A depurator-silencer for exhaust gas as set forth in claim 1, having an outlet region and comprising in said outlet region a chamber for collection of solid waste, said chamber having openings through which it communicates with said outlet region of the device.

9. A depurator-silencer for exhaust gas as set forth in claim 8, comprising a spindle-shaped body inserted within said outlet region of the device in order to improve the collection of said solid waste into said collection chamber through said openings.

10. A depurator-silencer for exhaust gas as set forth in claim 8, wherein said collection chamber comprises a box which may be dismounted in order to discharge the accumulated solid waste.

11. A depurator-silencer for exhaust gas as set forth in claim 8, wherein said collection chamber has a tube and said tube has a mouth subjected to aerodynamic suction by action of the entering exhaust gas.

* * * * *